(12) United States Patent
Bhattacharya et al.

(10) Patent No.: US 10,767,980 B2
(45) Date of Patent: Sep. 8, 2020

(54) METHOD OF DETERMINING DIAMETRICAL GROWTH OF REFORMER TUBES

(71) Applicants: Apratim Bhattacharya, Norwood, MA (US); Kang Xu, Williamsville, NY (US); Troy M Raybold, Colden, NY (US); Minish Mahendra Shah, East Amherst, NY (US)

(72) Inventors: Apratim Bhattacharya, Norwood, MA (US); Kang Xu, Williamsville, NY (US); Troy M Raybold, Colden, NY (US); Minish Mahendra Shah, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 16/274,414

(22) Filed: Feb. 13, 2019

(65) Prior Publication Data

US 2020/0256666 A1    Aug. 13, 2020

(51) Int. Cl.
| | |
|---|---|
| *G01L 1/00* | (2006.01) |
| *G01B 11/16* | (2006.01) |
| *G01N 25/00* | (2006.01) |
| *G01L 1/04* | (2006.01) |
| *G01B 11/12* | (2006.01) |

(52) U.S. Cl.
CPC ........... *G01B 11/16* (2013.01); *G01B 11/12* (2013.01); *G01L 1/04* (2013.01); *G01N 25/00* (2013.01)

(58) Field of Classification Search
CPC .......... G01B 11/16; G01B 11/12; G01L 1/04; G01N 25/00

USPC ........................................................... 73/787
See application file for complete search history.

(56) References Cited

U.S. PATENT DOCUMENTS

| | | | |
|---|---|---|---|
| 4,440,496 A | 4/1984 | Milana | |
| 7,046,356 B2 | 5/2006 | Bondurant et al. | |
| 10,274,375 B2 * | 4/2019 | Dubbs | G01J 5/0044 |
| 2005/0237519 A1 * | 10/2005 | Bondurant | G01N 21/954 |
| | | | 356/241.1 |
| 2009/0071257 A1 * | 3/2009 | Neagle | G01N 3/12 |
| | | | 73/708 |
| 2014/0080928 A1 * | 3/2014 | Kelficens | C07C 29/1518 |
| | | | 518/704 |
| 2014/0105243 A1 * | 4/2014 | Tait | B01J 19/0013 |
| | | | 374/102 |

(Continued)

FOREIGN PATENT DOCUMENTS

| | | |
|---|---|---|
| JP | H07218442 A | 8/1995 |
| WO | 2013084611 A1 | 6/2013 |

OTHER PUBLICATIONS

Robert D. Roberts et al.; Maximize Tube Life by Using Internal and External Inspection Devices; 2005 American Institute of Chemical Engineers; Process Safety Progress (vol. 24, No. 4); Dec. 2005, pp. 258-265; also published online Sep. 2, 2005 in Wiley InterScience (www.interscience.wiley.com); DOI 10.1002/prs.10091.

(Continued)

*Primary Examiner* — Max H Noori
(74) *Attorney, Agent, or Firm* — Iurie A. Schwartz (57) ABSTRACT

The present invention relates to modifying a reformer tube to facilitate regular tube inspections to assess the service life and subsequently predict its remaining life accurately.

10 Claims, 5 Drawing Sheets

Simplified schematic of a reformer tube 100 inside a simplified Furnace Box 200 where the proposed marking is made on the inner surface of the reformer tube (56) References Cited

U.S. PATENT DOCUMENTS

2015/0300989 A1 10/2015 Masleid et al.
2018/0230009 A1* 8/2018 Bedu-Amissah ......... C01B 3/34

OTHER PUBLICATIONS

J.D. Holladay et al.; An overview of hydrogen production technologies; Catalysis Today 139 (2009). pp. 244-260; Science Direct; Elsevier 2008; 0920-5861; DOI:10.1016/j.cattod.2008.08.039.

* cited by examiner

Figure 1: Inspection data obtained using current practices

Figure 2: Inspection data using current best practices where one of the welds cannot be identified.

Figure 3: Simplified schematic of a reformer tube 100 inside a simplified Furnace Box 200 where the proposed marking is made on the inner surface of the reformer tube Figure 4: A simplified schematic of a reformer tube 100 inside a simplified Furnace Box 200 where the proposed marking is made on the outer surface of the reformer tube.

Figure 5: The inspection data with the proposed reference mark in a region of low temperature of operation not susceptible to high thermal and/or mechanical stresses.

METHOD OF DETERMINING DIAMETRICAL GROWTH OF REFORMER TUBES

FIELD OF THE INVENTION

The present invention relates to a method for determining a diametrical growth/strain of a tubular reactor configured to conduct chemical reactions to facilitate accurate measurements of diameter growth for estimation of remaining operating life. More particularly, the present invention relates to a steam methane reforming reactor that is operated at elevated temperatures and elevated pressures to convert a carbonaceous feedstock into synthesis gas. Such operation can cause physical changes in the reactor tube, such as diametrical growth and elongation. The present invention also relates to an improved method to provide an estimate of diametrical growth and thus the remaining service life of a tubular reactor.

BACKGROUND OF THE INVENTION

Description of Related Art

Conventional steam methane reformers (SMR) employ a plurality of tubular reactors packed with reforming catalysts to convert a carbonaceous feedstock such as natural gas into a synthesis gas. The synthesis gas can be further processed to produce a variety of products, such as hydrogen, carbon monoxide, liquid fuels and chemicals. The tubular reactors are vertically mounted in a furnace usually in a parallel arrangement. Since the steam reforming process is highly endothermic, external heating is required. Burners installed within the furnace combust natural gas or some other fuel to support the endothermic reactions within the catalyst-filled tubes. Heat released from combustion reactions is transferred by radiation and convection to the tubular reactor outer wall, then by conduction from the outer wall to the inner wall, and then by conduction and convection to the reaction mixture and the catalyst in the tubular reactor interior. A portion of the heat absorbed by the tubular reactor is utilized to bring natural gas and steam feeds from their feed temperature of about 500° C.-650° C. to reaction temperature ranging from about 650° C.-950° C., to achieve desired hydrocarbon conversion. The reactor tube wall temperature typically ranges from about 850° C. to about 1095° C. While in operation the tube is susceptible to creep damage due to several factors including thermal and mechanical stresses.

Designers and/or operators of steam methane reforming reactors specify chemical and physical attributes of the tubular reactor, such as the metal alloy, diameter, length, and wall thickness commonly referred to as "minimum sound wall thickness." Reforming reactor tubes are typically made of high temperature stable metal alloys such as nickel based centrifugally cast alloys. The metal alloy is centrifugally cast in the form of a tube using a spinning mold rotating about its axis at high speeds (300-3000 RPM). The denser metal propagates towards the mold wall forming what is referred to as the "sound wall" of the alloy tube. The less dense impurities (slag, dirt, dross) and air bubbles, propagate to the inner surfaces. The inside surface of the metal alloy tube is subsequently machined to remove the non-metallic impurities that have spun to the center. The machined metal alloy tubes satisfying the specified "minimum sound wall" thickness is selected. Typically, selected tubes have wall thicknesses greater or equal to the minimum sound wall thickness along the entire length. Two or more of the selected alloy tubes are welded end-to-end to form a tubular reactor or a reformer tube, of specified length.

The reformer tube while in operation, experiences a combination of internal pressure and through-wall thermal stresses generated during startup cycles and operating transients. Such stresses can cause changes in the reformer tube, impacting inside diameters and/or outside diameters along the length of the tube. Changes in the diameter are indicative of creep damage and can be leveraged in estimating the remaining operating life of the reformer tube. Typical operating life span of a reformer tube is approximately 10-20 years. To ensure structural integrity, reformer tubes are inspected when a plant is shut down. This may be roughly every 5-8 years coupled with the schedule of changing the reforming catalysts inside the tubes. Premature and unscheduled replacements of reformer tubes are expensive. Thus, managing the reformer tube replacements based on the estimated remaining operating lives is imperative to avoiding unscheduled downtimes of the plant.

Several technologies have emerged and evolved over the past few years for non-destructive examination of a reformer tube. One such technology is laser-based inspection technology (Laser profilometry) that is a non-contact, non-destructive inspection technique to profile the surface of an object. Laser profilometry devices can be mounted to reformer tube also referred to as "crawlers" which are designed to move along the length of the tube, on either outside or inside surface of the tube. The laser probe projects a beam of light on the inner surface of the reformer tube which is then processed by a receiver to provide a measurement of the inner diameter at an axial position. For inner diameter measurements, the probe is inserted into each reformer tube by accessing it from the top flange and lowering it to the bottom of the tube. As the crawler moves along the length of the tube from the bottom to the top, data is acquired by the probe at specific intervals hereby defined as the pitch. For measuring outer diameters, the probe and the receiver are attached to a crawler designed to move on the outer surface along the length of the tube. The crawler for the outer diameter measurements can move up to the ceiling of the furnace box.

U.S. Pat. No. 7,046,356 to Bondurant relates to laser-based inspection of inside surfaces of reformer tubes that involves signal processing using a calibration function or table look-up to determine inside diameter growth profile by comparing newly collected data with baseline data. For the baseline data, Bondurant discloses use of data collected before first time use, or diameter of the top portion of the tube that is operating below temperatures associated with creep deformation. For reformer tubes, tube wall temperatures above 1300° F. are associated with high degrees of creep deformation.

The newly collected and the baseline data are used to calculate relative diametrical growth, also referred to as creep strain at any given location along the length of the tube as follows:

$$\text{creep strain at an axial location } \epsilon(l) = \frac{d_2 - d_1}{d_1} \quad \text{Eq. 1}$$

Where $d_1$ and $d_2$ are diameter measurements at a specific axial location 1 taken at two different instances during the operating time of the reformer tubes. These instances are usually several years apart. Fundamentally, assessing the health of catalyst tubes within a furnace is reliant on accurate measurement of creep strain at several axial locations along the tube length over time. High mechanical and thermal stresses are expected to shift the axial locations between different inspections. This physical shift can be significant during the time interval between two consecutive tube diameter measurements. It must be ensured that the diameter measurements used to calculate creep strain correspond to the same axial location.

Current practice involves performing diameter measurements before an assembly is put into service, defined hereby as the baseline inspection. During the non-operational period of the service life, defined hereby as turnaround, another set of diameter measurement is performed and compared with the baseline inspection. Creep strain is calculated as a function of tube length as described above in Equation 1. The result is an indication of remaining operating life of the tube. The operator may use this information to replace the tube during the current turnaround or allow the tube to continue operation until the next turnaround. If the inspected creep strain is above a specified threshold value, or if the data suggest that that the creep strain is expected to rise above the specified threshold before the next turnaround, the tube assembly is replaced.

Accurate measurement of creep strain relies on accurate diameter measurements made at accurately specified axial locations during turnaround inspections which are usually years apart. Different vendors, instruments and/or personnel may be involved in each inspection. To accurately calculate the creep strain, diameter measurements made years apart must be compared at the same axial location; otherwise, any deviation leads to erroneous calculation of creep strain.

To ensure diameter measurements at the same axial location are used, the current best practice is to use the reformer tube segment weld joints as reference points. Albeit not made for the purpose, welds are often easily detected in the data obtained from the inspection crawlers. Usually, at least two welds are visible in the inspection data. To ensure consistent comparison of inner diameters of these tubes, the location of the first observed weld point in the most recent inspection is shifted to match the location of the first observed weld point in the previous inspection. The locations of the other weld points are subsequently adjusted. The adjustments are made assuming that there has been no change in volume in the tube segments between the weld points. The shift of the first weld-point and the adjustment of the subsequent weld points constitute the alignment process, the result of which is the aligned current inspection data with the previous set of inspection data that enables accurate calculation of creep strain in Eq. 1. The shifting of the locations of the first observed weld point, thus constitutes a crucial step in the alignment process.

Specifically, to estimate a remaining life for a reformer tube, two sets of inspection data separated by time, are compared to estimate the strain and strain rate between the time periods $t_2$ and $t_1$. The strain and strain rates are used in conjunction with information on the metallic alloy used to fabricate the tube, to estimate the remaining service life of the reformer tube.

$$t_{rem} = f(\vec{\in}, \vec{\in}, \Sigma)$$

where $\vec{\in}, \vec{\in}$ represent multiple values for strain and strain rates respectively as a function of axial length. $\Sigma$ represents material specific parameters for a particular tube.

Figure 1:
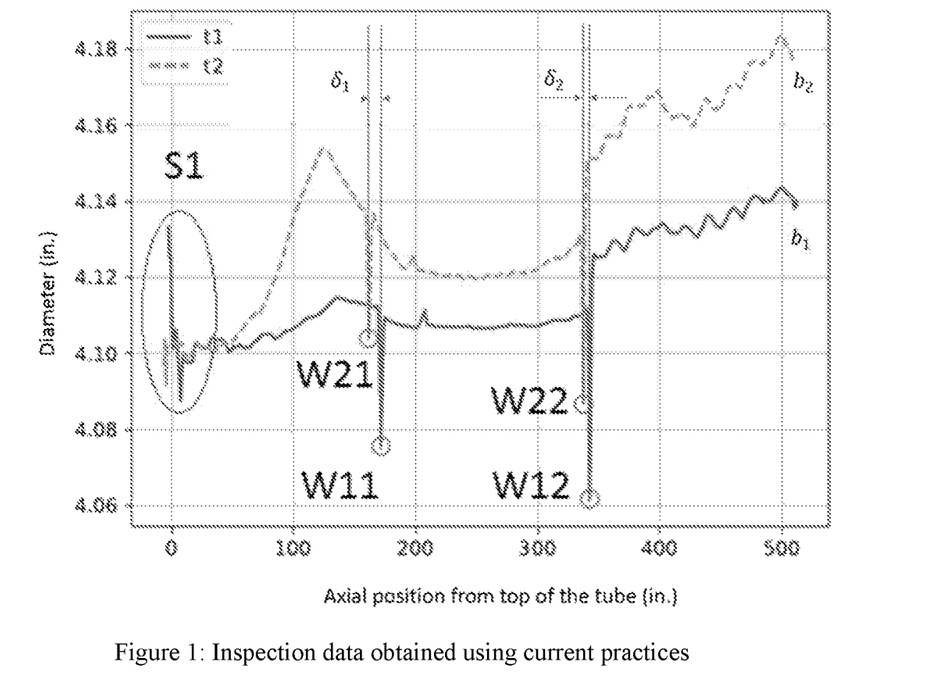
FIG. 1 is a depiction of the current practice where two sets of Laser profilometry data collected during inspections, separated by time period $\Delta t = t_2 - t_1$.

As an example, FIG. 1 is a depiction of the data obtained using the current practice where two sets of Laser profilometry data collected during inspections of the inner surface of a reformer tube, separated by time period $\Delta t = t_2 - t_1$. The inspection schedules can be at an interval of 5-8 years.

The y-axis depicts the tube inner diameter in inches. The x-axis represents distances along the length of the tube. The crawler with the probe and receiver is lowered into the tube as far as physically possible which is assumed to be the catalyst plate. The probe then collects data starting from the lowest accessible position (presumed to be the top of the catalyst plate) and ending near the top of the tube. The first measurement is made at the top of the catalyst plate. This point marks the bottom of the reformer tube ($b_1$ and $b_2$ in FIG. 1). The raw data from two inspections are plotted in FIG. 1 assuming that the first measurements in both inspections are taken at the bottom of the tube. The probe is then withdrawn to the top and it is assumed that between the first and the final measurements, the design length of the tube has been spanned. As observed from S1 in FIG. 1, the final point denoting the top of the tube cannot be clearly distinguished. Hence, it is possible for the actual curves not to be initiated at zero. For instance, if the probe travels a distance shorter than design distance between the catalyst plate and the top flange, then the curve will start at a point greater than zero. If the tube has elongated due to creep, the inspection curve will start at a point less than zero. Moreover, there could be residual catalysts present during the current inspection such that the points $b_1$ and $b_2$ might not correspond to the same location along the length of the tube. Combinations of these effects are also possible.

The resolution of diameter measurements of the inspection methodology used in this example is 0.001 in. The continuous trace shows the data (diameter measurements along the length of the tube) from an inspection performed at time $t_1$ and the dashed trace depicts the data from an inspection performed at time $t_2$ where $t_2 > t_1$. Weld points (W11, W12, W21, and W22) are denoted by sharp peaks in FIG. 1. Specifically, W11 and W12 represent the welds in the previous inspection data at $t_1$. W21 and W22 represent the welds in the current inspection data at $t_2$. As can be observed, the current inspection data shows that the tube has expanded due to creep that is manifested by unequal axial shifts in the weld points W21 and W22. Specifically, the shift of the abscissas between the weld points W11 and W21 is 9.91 in. ($\delta_1 = 9.91$ in.) and that between W22 and W12 is 8.15 in ($\delta_2 = 8.15$ in.).

Current practice involves aligning the weld points such that the locations of the weld points W21 and W22 from the current inspection in FIG. 1 matches the weld points of the previous inspection, W11 and W12. This is performed by solving the set of linear equations:

$$c + mx_{21} = x_{11}$$

$$c + mx_{22} = x_{12}$$

where $x_{11}$ represents the location of the first weld point, W11 in the first inspection, $x_{12}$ represents the location of the second weld point, W12 in the first inspection, $x_{21}$ represents the location of the first weld point, W21 in the current inspection and $x_{22}$ represents the location of the second weld point, W22 in the current inspection. Solution of the simultaneous equations provide c and m. Variable c represents the intercept or the fixed distance by which the first weld point, W21 is shifted in the current inspection data and coefficient m represents the slope or the factor by which the subsequent data points must be transformed in the same data set such that both the weld points have the same positions along the length of the tube. This would result in a set of aligned inspection data for calculation of strain.

Once the alignment is complete, strain at a longitudinal location indexed by i along the length of the tube is calculated as the ratio of growth of the diameter at time $t_2$ to the initial diameter measured at $t_1$ at that particular location i:

$$\epsilon_{t_2}(i) = \frac{d_{t_2}(i) - d_{t_1}(i)}{d_{t_1}(i)}$$

Herein, $\epsilon_i(i)$ represents the strain at location i measured at time $t_2$, $d_{t_i}(i)$ represents the diameter measurement at location indexed by i at time $t_i$ and $d_{t_2}(i)$ represents the diameter measurement at location i at time $t_2$. This is the same as Equation 1, with the axial locations explicitly noted.

In some cases, the weld points cannot be clearly detected by laser profilometry. In such case, the process of shifting the initial weld points between the current inspection and earlier inspections can be unreliable due to the presence of creep or the inability of inspection technologies to clearly detect the location of the weld points. This is expected to provide erroneous calculation of strain.

Preservation of the integrity of the comparison is of utmost importance to estimate the remainder life of a reformer tube. The alignment process is expected to ensure that two specific data points corresponding to the same exact position along the length of the tube separated in time are being used to calculate the strain. However, as observed in FIG. 1, there is creep indicated by high internal diameter measurements, in the segment before the first weld point, W21 in the current inspection data. Current practice involves shifting the most recent data such that the abscissas of W21 and W11 are identical. In this specific example, the most recent inspection data is to be shifted by 9.91 in. towards the right. This shift is ad-hoc and is expected to give rise to erroneous calculation of strain. This is particularly due to the absence of a distinct location denoting the top of the tube in the inspection traces. As mentioned earlier, current practice involves the assumptions that the crawlers are inserted into the reformer tube to approximately touch the surface of the catalyst plate and that the crawler measures a distance approximately equal to the design length of the reformer tube. There could be residual catalysts present on the catalyst plate. Moreover, there is not a distinct reliable mark representing the top of the tube where the crawler should stop recording the measurements. The stopping point for the crawler is inconsistent between the two measurements. As evident from FIG. 1, the initial set of points, S1 provide an approximate location of the top of the tube. Specifically, for the current inspection data, the abscissa of the point up to which the measurement has been performed by the crawler is −6.987 in. whereas for the previous inspection it is −2.3526 in.

Another aspect of strain calculation is the large amount of data collected for a typical steam methane reformer furnace. This may contain a significant number of tubes (between 200-400). Moreover, the number of axial locations, used for measurements, associated with each tube can vary between 500-1800. The alignment process for a plurality of tubes has to be performed within relatively short periods of time and decisions regarding tube replacement usually must be made within a span of time ranging from a few hours to a couple of days. Numerical algorithms are used to perform the alignment process to ensure that creep strain is calculated based on diameter measurements at the same axial locations. For welds that are not clearly detected by laser profilometry, the automated algorithms can incorrectly identify or even miss the detection of the weld location.

Figure 2:
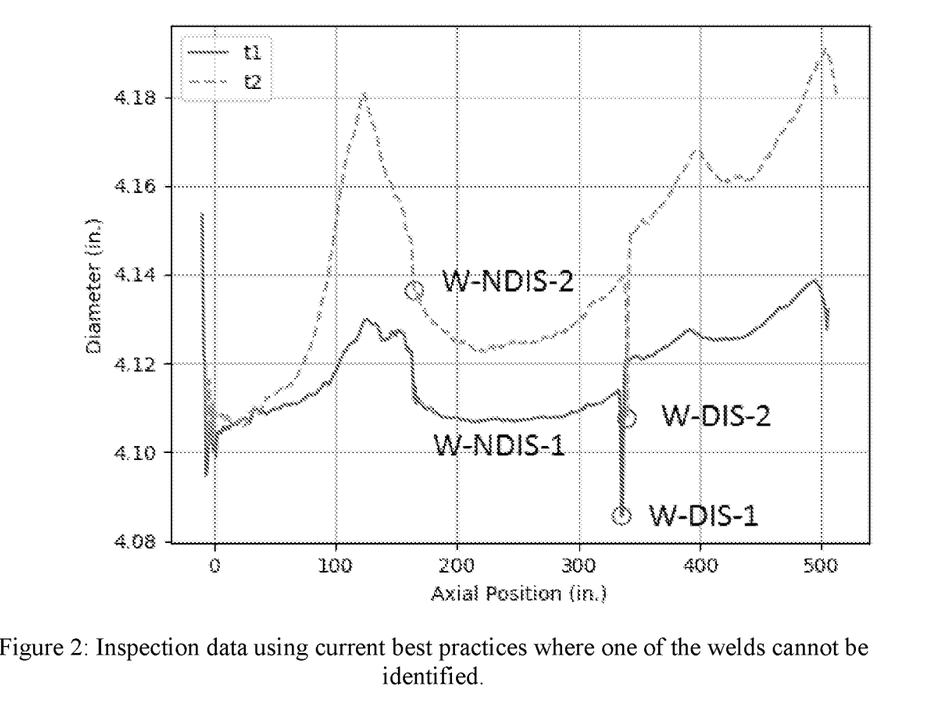
FIG. 2 is a depiction of a set of inspection data where one of the weld points cannot be clearly resolved by the inspection technology due to manufacturing differences and high creep.

In the current practice, weld points have been used in lieu of reliable distinct markings. However, as evident from FIG. 2 weld points W-NDIS-1 and W-NDIS-2 cannot be identified due to manufacturing differences and eventually unusual creep in the top segment of the tube. The analytic algorithms fail to detect these weld points. This example accentuates the fact that weld points are not expected to serve the purpose of providing distinct reliable markings and cannot be reliably used for alignment purposes.

Critical recommendations of keeping an assembly in service can be erroneous if the most recent value corresponds to one axial position and the previous inspection value corresponds to a different axial position along the length of the tube that results in inaccurate calculation of creep strain. Thus, there remains a need for an improved technology facilitating the inspection process. In order to overcome the limitations of the current practices to accurately measure creep strain, an easily detectable circumferential reference marking is proposed at an axial position, less susceptible to high thermal or mechanical stresses to ensure consistent axial alignment of diametrical data and efficient use of computer algorithms for automation of data analysis.

It is an object of the invention to provide a reliable and reproducible method for measuring the reformer tube creep strain, and in turn predict the remaining service life of said reformer tubes.

It is another object of the invention to provide a distinct reference mark on the inside and/or the outside of the reformer tube. The mark can be either made during the manufacturing process by removing additional material from the surface of the tube (invasive) or attaching additional material on the surface of the tube, for automated comparison of inspection data usually separated in operating times.

Other objects and aspects of the present invention will become apparent to one skilled in the art upon review of the specification, drawings and claims appended hereto.

SUMMARY OF THE INVENTION

According to an aspect of the invention, a method for determining diametrical growth in a reformer tube is provided. The method includes:

providing a reformer tube having at least one machined, circumferential reference marking or groove on the inside of the reformer tube located in a region of low reformer tube creep growth;

measuring a first set of inside diameters at a time $t_1$ along a predefined length of the reformer tube that contains the circumferential reference marking(s) as well as at least a portion of the tube that while in operation gets heated to a temperature greater than 1300° F.;

measuring a second set of inside diameters along the predefined length of the reformer tube after operating the reformer tube for an additional period of time, $\Delta t$, where $t_2 = t_1 + \Delta t$;

aligning the second set of diameter measurements using the circumferential reference marking and a second available reference point to ensure that the axial locations of the entire length for the measurements from time $t_1$ are the same as the axial locations of the entire length of the measurements from time $t_2$; and calculating creep strain along the length of the tube by dividing the difference in diameter measurements at times $t_1$ and $t_2$, by the diameter measurement at time $t_1$, for each location along the length of the tube, thereby determining diametrical growth in a reformer tube.

According to another aspect of the invention, a method for determining diametrical growth in a reformer tube is provided. The method includes:

providing a reformer tube having a circumferential reference marking on the outside of the reformer tube achieved through welding at least one metallic ring on the outer surface of the reformer tube;

measuring a first set of outside diameters at a time $t_1$ along a predefined length of the reformer tube that contains the circumferential reference marking(s) as well as at least a portion of the tube that while in operation gets heated to a temperature greater than 1300° F.;

measuring a second set of outside diameters along the predefined length of the reformer tube after operating the reformer tube for an additional period of time, $\Delta t$, where $t_2 = t_1 + \Delta t$;

aligning the second set of diameter measurements using the circumferential reference marking and a second available reference point to ensure that the axial locations of the entire length for the measurements from time $t_1$ are the same as the axial locations of the entire length of the measurements from time $t_2$; and calculating creep strain along the length of the tube by dividing the difference in diameter measurements at times $t_1$ and $t_2$, by the diameter measurement at time $t_1$, for each location along the length of the tube, thereby determining diametrical growth in a reformer tube.

BRIEF DESCRIPTION OF THE FIGURES

The objects and advantages of the invention will be better understood from the following detailed description of the preferred embodiments thereof in connection with the accompanying figures wherein like numbers denote same features throughout, wherein.

DETAILED DESCRIPTION OF THE INVENTION

For illustrative purposes the problem that the present invention addresses will be described with reference to a reactor comprising a tube or plurality of tubes made by centrifugal castings welded together to the desired length.

The present invention provides a reformer tube having a circumferential reference marking to facilitate regular tube inspections to assess the service life and subsequently predict remaining service life accurately. This facilitation pertains to alignment of the current inspection data with one or more of previous inspection data. The present invention proposes circumferentially marking a specific region along the length of the tube that is relatively less susceptible to thermal stresses and serves either as an initial starting point or a generic reference point for aligning inspection data at a later time.

The modification consists of circumferential markings on either the inner or outer surface of the reformer tube or both. The marking can either appear as a groove due to removal of metal (invasive) on either the inner surface or as a circumferential metallic ring (non-invasive) on the outer surface. The markings can be made either during the process of manufacturing the tubes, or after the manufacturing process before the assemblies are put into service. The inner and/or outer markings should be made in a region of low creep growth that is where the operating wall temperatures of the reformer tubes are below 1300° F. Inner marking can be made near the top of the tube such that after installing the tube in the furnace, the inner marking will be above the furnace ceiling. Outer marking must be made such that after installing the reformer tube in the furnace, the marking is below the ceiling of the furnace, since the crawler cannot move beyond the ceiling of the furnace box. The marking should not violate the minimum required soundness of the tube wall. The dimensions of any marking should be resolved by the inspection methodology such as laser profilometry. Alternatively, diametrical growth measurement is performed through a stylus-based measurement technique.

The inner wall of each of the newly cast tubes are rough. They are subsequently machined to remove surface roughness, and accumulated impurities on the inner surfaces during the manufacturing process. Machining is performed using a lathe in a pull boring process. In the pull boring process, a bar is inserted inside the tube all the way through its length. After emerging at the opposite end, the bar is fit with a single-point or multi-point pull boring head. The bar is engaged in the tool drive mechanism and drawn back through the inner surface of the reactor tube. The tooling head holds a carbide insert of the appropriate grade and style suitable for the tube material. This insert functions to enlarge the inner diameter slightly as it is pulled into the tube. Coolant pumped around the boring bar channels flows up and out through the hollow center to aid metal removal and protect the surface. The inner diameter marking can also be made using the pull boring process. The outside diameter markings can be achieved by welding a ring made of a similar Ni based alloy on the external surface of the reformer tube.

Figure 3:
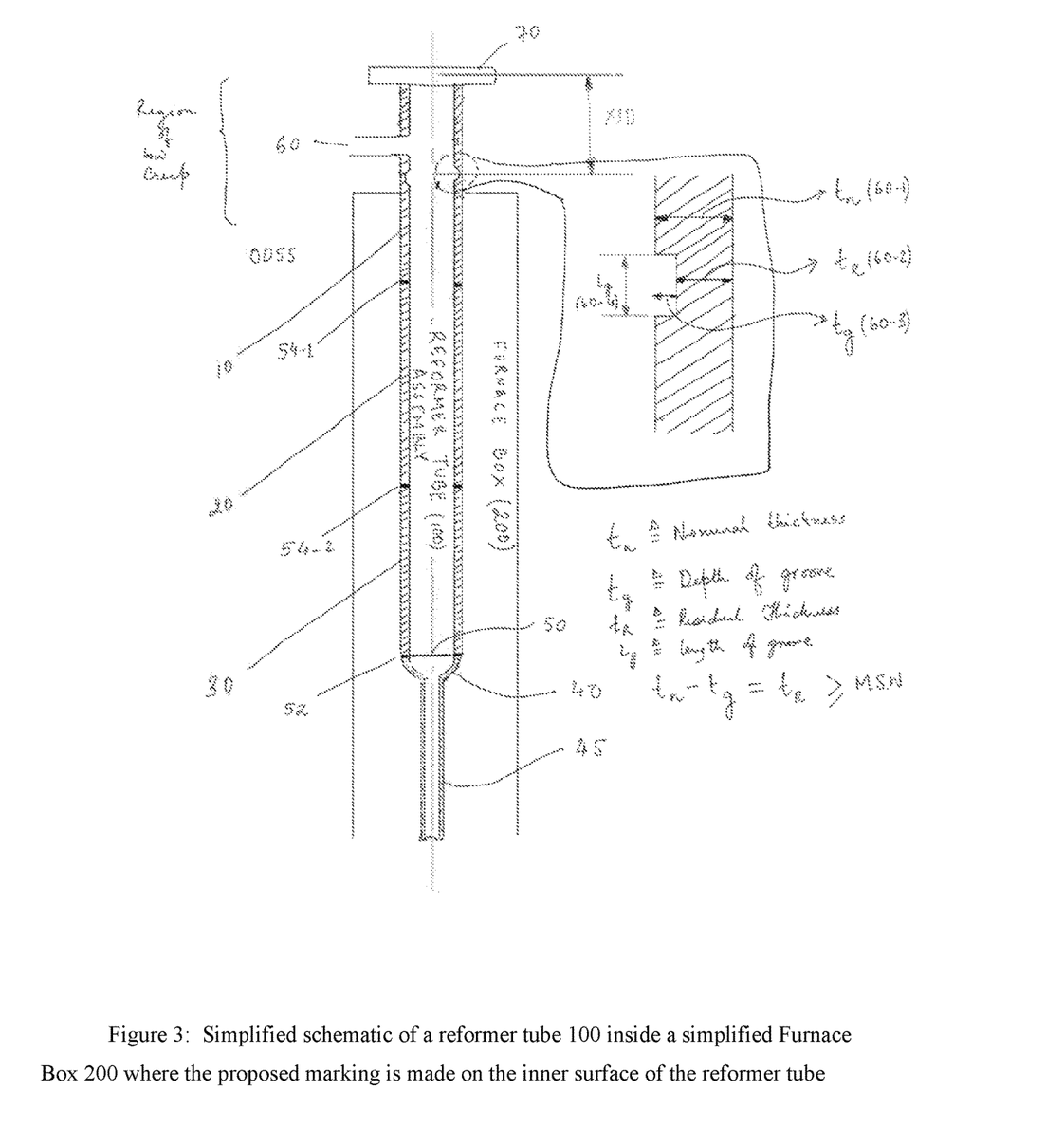
FIG. 3 is a simplified schematic of a reformer tube assembly constituted by 3 alloy segments, a conical reducer and an outlet pigtail wherein a circumferential marking has been provided on the inside surface of the reformer tube.

FIG. 3 is a simplified schematic of a reformer tube 100 inside a simplified furnace box 200. The reformer tube is made of several alloy segments 10, 20 and 30 welded at points 54-1 and 54-2. The top of the tube is closed by a flange 70. The process gas enters the tube through an inlet pigtail 60. The bottom alloy segment 30 is welded at 52 to a conical reducer 40 which is subsequently welded to an outlet pigtail 45. Catalyst support plate 50 supports the catalyst inside the tube. The internal surface of the tube is accessed by removing flange 70 and diameter measurements are recorded by lowering a crawler with a laser probe and receiver down to the catalyst support plate 50.

In one exemplary embodiment of the invention, a circumferential reference marking is provided on the inner surface of the top alloy segment 10. Several details of the reference marking are shown as an inset in FIG. 3. The circumferential reference is made at a predetermined distance XID from flange 70. The distance XID can be such that the circumferential reference maybe located either outside of the furnace box 200 or inside it, depending on the marking desired, as further discussed herein. The circumferential reference marking is a machined groove made around the entire inner circumference of the reformer tube. The groove has a depth $t_g$ (60-3) and length $l_g$ (60-4). The dimensions of the groove should be such that it is resolvable by the inspection device such as a laser profilometry probe. The length of the groove $l_g$ must be greater than the pitch of the crawler. In all cases the depth $t_g$ (60-3) must be small enough such that it does not compromise the service life of the reformer tube. Thus, for a reformer tube with nominal thickness denoted by $t_n$ (60-1), the thickness of the residual wall $t_R$ (60-2) where $t_R = t_n - t_g$, must always be greater than the minimum sound wall thickness (MSW). This is the minimum allowable thickness of the reformer tube to meet the design service life at the design operating conditions. Thus $t_R \geq$ MSW.

Figure 4:
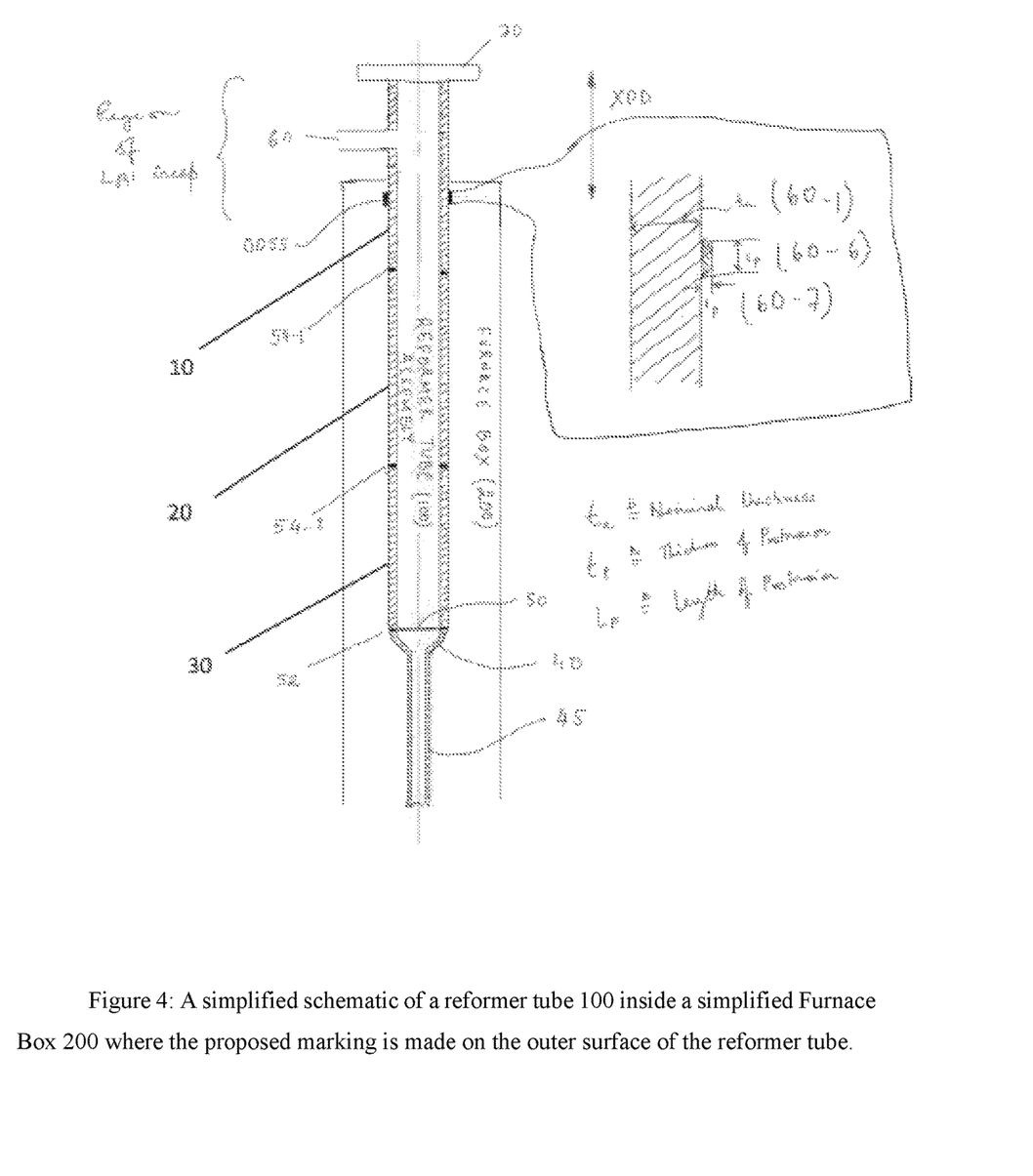
FIG. 4 is a simplified schematic of a reformer tube assembly constituted by 3 alloy segments, a conical reducer and an outlet pigtail wherein a circumferential marking has been provided on the outside of the reformer tube.

FIG. 4 depicts another exemplary embodiment of the invention where a circumferential reference is provided on the outer surface of the top alloy segment 10. Several details of the reference marking are shown as an inset. The circumferential reference is made at a predetermined distance XOD from the top flange 70. The distance XOD must be such that the circumferential reference is located inside of the furnace box 200 such that it is accessible by the inspection device. The thickness of the protrusion is denoted by $t_p$ (60-7) and the length of the protrusion is ted by $l_p$ (60-6). The length of the protrusion $l_p$ must be greater than the pitch of the crawler. The outer diameter measurements are performed by attaching a crawler on the outer surface of the reformer tubes from the weld point 52. The tubes are accessed from inside of the furnace box 200. The crawler moves up the length of the tube to the roof of the furnace box 200.

As an example of a circumferential reference mark being made on the inner surface of the reformer tube, and with reference to FIG. 3, the minimum sound wall thickness (MSW) for a reformer tube is specified to be 0.465 in. During manufacturing, the sound wall usually provided by the vendor is at least 15% higher than the minimum sound wall thickness specified. Thus, the nominal thickness of the wall $t_n$ (60-1) is about 0.535 in. In such a case the circumferential reference mark is made on the inside of the reformer tube at distance XID (about 2 ft. from flange 70) by prolonging the pull-boring process such that the depth reference mark $t_g$ (60-3) is 0.05 in. The thickness of the residual wall $t_R$ (60-2) is, therefore, 0.485 in. which is greater than the specified minimum sound wall thickness. The length of the groove $l_g$ (60-4) should be greater than the pitch of the inspection device which is defined herein as the minimum distance along the length of the tube, the internal diameter inspection device can traverse to gather information.

As another example, and with reference to FIG. 4 for the reference mark being made on the outer surface of the reformer tube at a distance XOD (about 3 ft. from flange 70), a circular ring of thickness $t_p$ (60-7) is welded on the surface. As an example the thickness $t_p = \frac{1}{8}$ in. and the length of the protrusion $l_p$ (60-6) should be greater than the pitch of the inspection device on the outside.

Figure 5:
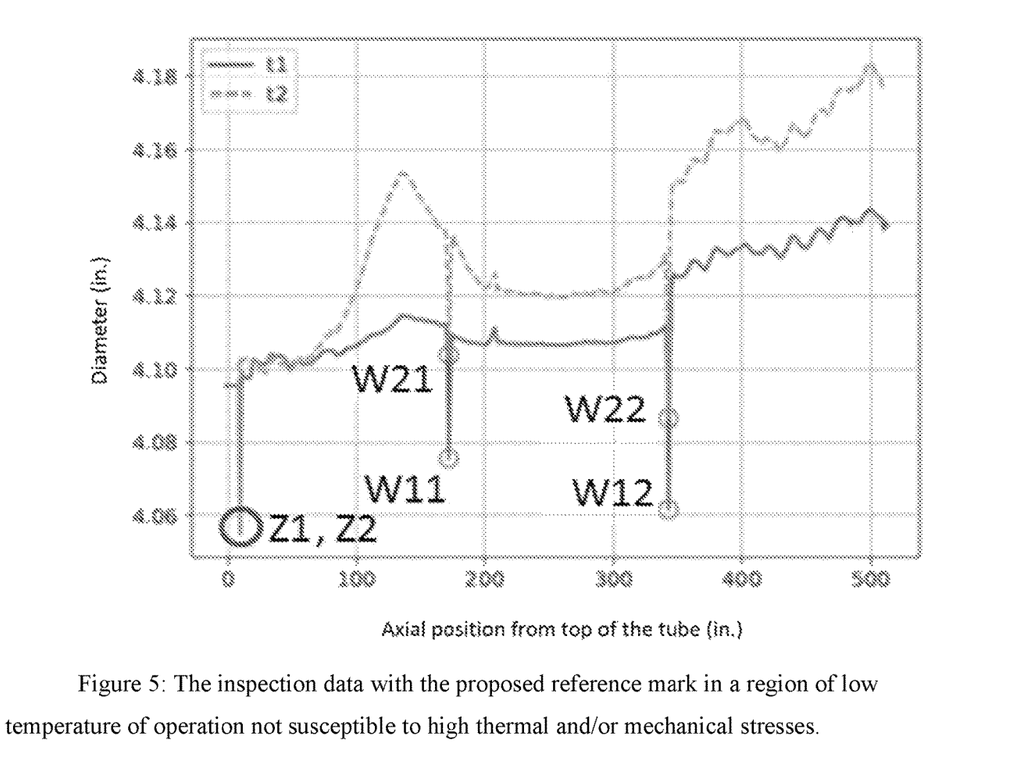
FIG. 5 is a depiction of the inspection data with the proposed reference mark in a region of low creep.

The distinct circumferential reference marking proposed in the current invention serves the purpose of providing a distinct mark that would be used to process inspection data using automated analytic algorithms. While practicing the proposed invention, and as depicted in FIG. 5, additional peaks Z1 and Z2 would be observed corresponding to circumferential reference marking in the inspection traces for times $t_1$ and $t_2$ respectively. The algorithm described above is used to align the inspection data such that Z1 and Z2 correspond to the same point along the length of the reformer tube. Based on the linear transformation algorithm, the data points in the two sets of inspection data at times $t_1$ and $t_2$ are aligned. Based on the data and the design of the tube assembly, more than one set of linear transformations maybe necessary. The process is much more reliable compared to the current best practice for two reasons. First, the markings are provided solely for aligning the inspection data. Thus, it can aid in calibrating the inspection device. Second, the markings are made in a region of low creep growth near the top flange of the tube assembly where the skin temperature of the tube does not exceed 1300° F. Additional reference marks may be made for the purpose of validating the linear transformation.

This procedure would ensure the use of proper diameter measurements from the inspection at $t_1$ to be compared to the diameter measurements at time $t_2$. The presence of the proposed circumferential reference marking in both the inspection data sets separated in time facilitates the identification of a clear reference mark not exposed to high temperatures inducing creep, for comparing the two sets of inspections for calculating metrics such as strain and the corresponding strain rate at axial locations along the length of the tube.

A proper remaining life estimate can have far reaching economic benefits. Installation of one reformer tube costs about $25,000 given the current cost of nickel. Additionally, installations are performed offline which entails shutdown of the entire reformer leading to losses from production. With the help of better estimates of remnant life, it is possible to schedule maintenance and harvest reformer tubes during scheduled turnaround times. This will also prevent shutdowns due to unprecedented tube failures arising out of incorrectly analyzed tubes leading to incorrect estimates of tube life. The current invention proposes a methodology of providing a reference marking prior to installation, to facilitate accurate diameter measurements along the length of reformer tubes to obtain accurate metrics to estimate remaining service lives at specific time intervals during operation.

Although various embodiments have been shown and described, the present disclosure is not so limited and will be understood to include all such modifications and variations as would be apparent to one skilled in the art.

What is claimed is:

1. A method for determining diametrical growth in a reformer tube comprising:
   providing a reformer tube having at least one machined, circumferential reference marking or groove on the inside of the reformer tube located in a region of low reformer tube creep growth;
   measuring a first set of inside diameters at a time $t_1$ along a predefined length of the reformer tube that contains the circumferential reference marking(s) as well as at least a portion of the tube that while in operation gets heated to a temperature greater than 1300° F.;
   measuring a second set of inside diameters along the predefined length of the reformer tube after operating the reformer tube for an additional period of time, $\Delta t$, where $t_2 = t_1 + \Delta t$;
   aligning the second set of diameter measurements using the circumferential reference marking and a second available reference point to ensure that the axial locations of the entire length for the measurements from time $t_1$ are the same as the axial locations of the entire length of the measurements from time $t_2$, and calculating creep strain along the length of the tube by dividing the difference in diameter measurements at times $t_1$ and $t_2$, by the diameter measurement at time $t_1$, for each location along the length of the tube, thereby determining diametrical growth in a reformer tube.

2. A method for determining diametrical growth in a reformer tube comprising:

providing a reformer tube having a circumferential reference marking on the outside of the reformer tube achieved through welding at least one metallic ring on the outer surface of the reformer tube;

measuring a first set of outside diameters at a time $t_1$ along a predefined length of the reformer tube that contains the circumferential reference marking(s) as well as at least a portion of the tube that while in operation gets heated to a temperature greater than 1300° F.;

measuring a second set of outside diameters along the predefined length of the reformer tube after operating the reformer tube for an additional period of time, $\Delta t$, where $t_2=t_1+\Delta t$;

aligning the second set of diameter measurements using the circumferential reference marking and a second available reference point to ensure that the axial locations of the entire length for the measurements from time $t_1$ are the same as the axial locations of the entire length of the measurements from time $t_2$; and calculating creep strain along the length of the tube by dividing the difference in diameter measurements at times $t_1$ and $t_2$, by the diameter measurement at time $t_1$, for each location along the length of the tube, thereby determining diametrical growth in a reformer tube.

3. A reformer tube according to claim 1.

4. The reformer tube according to claim 3, wherein the marking of the depth of the circumferential reference marking(s) is larger than the detection limit of the diametrical inspection device.

5. The marking of claim 1, wherein the circumferential reference marking has a predetermined depth necessary to retain the design minimum sound wall thickness.

6. The method of claim 1, wherein a diametrical growth measurement is performed through a technique selected from either laser profilometry or stylus based measurements.

7. The method of claim 1, wherein the diameter growth is determined by automated computational algorithms.

8. The method of claim 1, wherein the diametrical growth in a reformer tube is measured though the use of a second available reference point, wherein said second reference point is a weld mark.

9. The method of claim 2, wherein a diametrical growth measurement is performed through a technique selected from either laser profilometry or stylus based measurements.

10. The method of claim 2, wherein the diametrical growth in a reformer tube is measured though the use of a second available reference point, wherein said second reference point is a weld mark.

* * * * *